United States Patent

Morden et al.

[15] 3,704,637

[45] Dec. 5, 1972

[54] TORQUE RESPONSIVE TRANSMISSION MECHANISM

[72] Inventors: Russell L. Morden; Ralph W. Perkins, both of Lansing, Mich.

[73] Assignee: General Motors Corporation, Detroit, Mich.

[22] Filed: April 5, 1971

[21] Appl. No.: 131,267

[52] U.S. Cl. ..................................... 74/751, 74/337
[51] Int. Cl. ................................................ F16h 5/54
[58] Field of Search ............................... 74/751, 337

[56] References Cited

UNITED STATES PATENTS

| | | | |
|---|---|---|---|
| 1,311,236 | 7/1919 | Kittredge | 74/751 |
| 1,541,267 | 6/1925 | Kittredge | 74/751 X |
| 1,942,198 | 1/1934 | Blackstock | 74/337 X |

FOREIGN PATENTS OR APPLICATIONS

| | | | |
|---|---|---|---|
| 434,954 | 12/1911 | France | 74/751 |

*Primary Examiner*—Carlton R. Croyle
*Attorney*—W. E. Finken and D. L. Ellis

[57] ABSTRACT

A mechanism for transmitting torque from a rotating input shaft to a rotating output shaft and for automatically increasing the transmission ratio in response to the magnitude of the applied torque, the mechanism including a planetary gear train driven by the input shaft, a pawl member rotatable as a unit with the output shaft and bodily movable relative thereto in a radial direction, a cam on the input shaft and a follower on the output shaft. During conditions of low torque input a spring urges the pawl member to a retracted position coupling the output shaft to the input shaft to establish a direct drive unitary transmission ratio therebetween. When torque exceeding a predetermined magnitude is applied to the input shaft the cam and follower cooperate to force the pawl member to an extended position coupling the output shaft to the planet carrier of the planetary gear train, thus establishing a torque transmission ratio between the shafts which exceeds unity.

3 Claims, 4 Drawing Figures

PATENTED DEC 5 1972 3,704,637

INVENTORS
Russell L. Morden &
BY Ralph W. Perkins
D. L. Ellis
ATTORNEY

TORQUE RESPONSIVE TRANSMISSION MECHANISM

This invention relates generally to a mechanism for mechanically transferring torque from one rotating shaft to another and in particular to such a mechanism wherein the transmission ratio is automatically changeable.

In the typical modern automobile steering system the steering wheel effects movement of the steerable road wheels through a gear train having a torque transmission ratio well in excess of 1:1. Traditionally, this high gear ratio has been necessary because of the resistance to turning offered by the steerable wheels. While widely available power assist means have all but eliminated the necessity for high ratios in the steering gear, automobile steering systems still include high ratio gear trains requiring a substantial amount of steering wheel turning for the simple reason that the operator must be capable of manually steering the vehicle in the event of failure of the power assist means. Several different systems have been proposed which would permit the use of low steering gear ratios in automobiles, one such system including a planetary gear train which is maintained inactive until a power assist means failure occurs and is thereupon activated to boost the gear ratio to a level permitting manual steering. A transmission mechanism according to this invention represents an improvement over known transmission devices of the planetary gear type.

The primary feature of this invention is that it provides an improved transmission mechanism particularly adapted for use in automotive steering systems which are characterized by low steering gear ratios. Another feature of this invention is that it provides an improved transmission mechanism wherein the torque transmission ratio between an input shaft and an output shaft automatically increases when the torque applied to the input shaft exceeds a predetermined magnitude. Still another feature of this invention resides in the provision in the transmission mechanism of automatic ratio changing means including a pawl supported on the output shaft for radial movement relative to the latter and operative in a retracted position to establish a unitary transmission ratio between the input and output shafts and in an extended position to activate the planetary gear train and establish a transmission ratio exceeding unity, the pawl being moved between the extended and retracted positions by cam means responsive to the magnitude of the torque experienced by the input shaft. Still another feature of this invention resides in the provision in the transmission mechanism of a spring means operative to bias the pawl toward the retracted position thereof and thereby normally maintain a unitary transmission ratio except when excessive torque is applied to the input shaft whereupon the spring means is overcome by the cam means and the transmission ratio automatically increased.

These and other features of this invention will be readily apparent from the following specification and from the drawings wherein.

Figure 1:
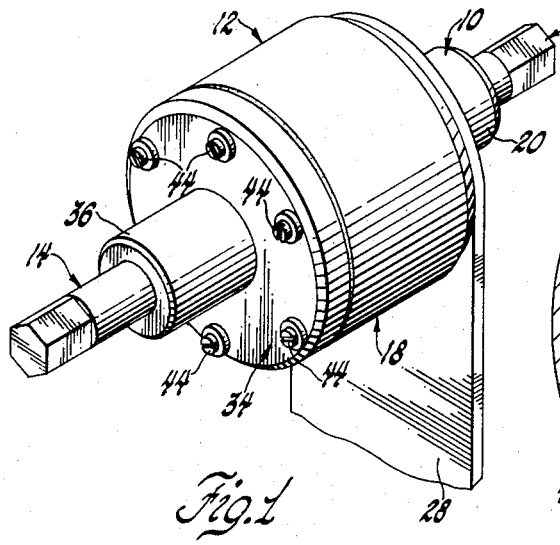
FIG. 1 is a perspective view of a transmission mechanism according to this invention.
Figure 2:
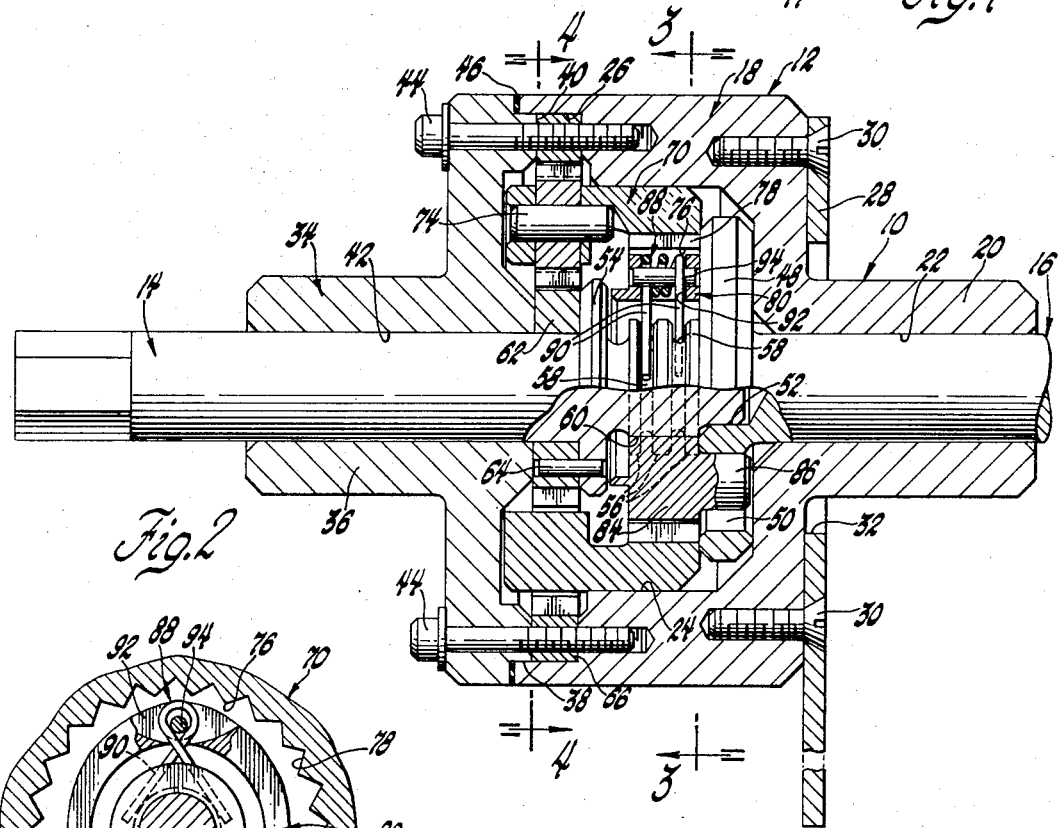
FIG. 2 is an enlarged partially broken away longitudinal sectional view of a transmission mechanism according to this invention.

Referring now to FIGS. 1 and 2 of the drawings, there is shown a transmission mechanism according to this invention designated generally 10 including a housing 12 rotatably supporting an input shaft 14 and an output shaft 16. The housing 12 includes a generally cylindrical support shell 18 having a cylindrical neck 20 projecting therefrom. A shaft bore 22 extends through the neck 20 of the shell and into a first counterbore 24, the counterbore 24 terminating in a second counterbore 26. The shell 18 is rigidly connected to a plate member 28 by a plurality of screws 30, the neck 20 of the shell projecting through a circular aperture 32 in the plate member. It will be understood that the plate member 28 is merely a schematic representation of any appropriate support means which is stationary relative to the input and output shafts, as for example the conventional toe plate of an automobile vehicle body when the power transmission mechanism 10 is incorporated into the vehicle steering system.

The housing 12 further includes a circular cap 34 having a neck 36 and a cylindrical surface 38 of diameter generally equal to that of counterbore 26, surface 38 terminating in an annular shoulder 40. A shaft bore 42 extends through the neck 36 of the cap and cylindrical surface 38 provides a pilot for installation of the cap on the shell 18, the cap being maintained on the shell with a gasket 46 therebetween by a plurality of machine screws 44. When the cap and shell are so assembled, the bores 42 and 22 are axially aligned and the counterbores 24 and 26 define an interior cavity in the housing.

As seen best in FIG. 2, the input shaft 16 is rotatably supported within the bore 22 in shell 18 and terminates interiorly of the housing in a circular flange 48 having a slot 50 extending radially outward and a centrally located pilot bore 52. The input shaft 14 is rotatably supported in bore 42 in the cap and is rotatably piloted in pilot bore 52 of the output shaft 16, the input and output shafts thus being arranged in axial alignment. Interiorly of the housing 12 the input shaft 14 includes a flange 54 and a cylindrical bearing surface 56 having therein a pair of circular grooves 58 and a longitudinally extending pawl receptacle in the form of a V-shaped groove 60, FIG. 3.

Figure 4:
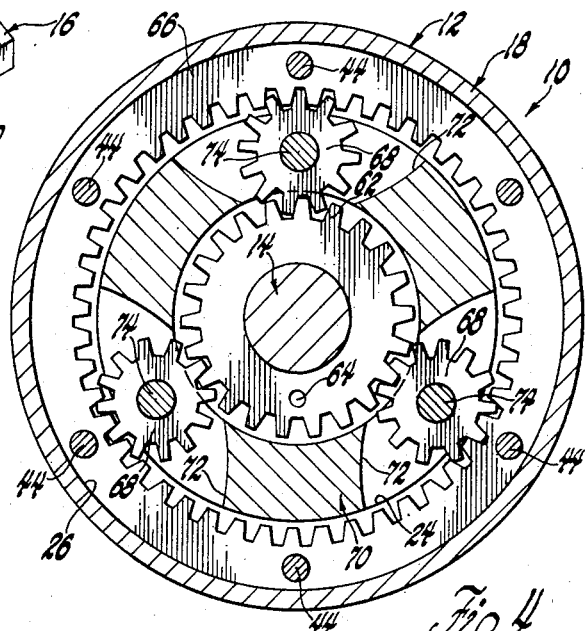
FIG. 4 is a sectional view taken generally along the plane indicated by lines 4—4 in FIG. 2.

Referring now to FIGS. 2 and 4, a planetary gear train is disposed within the housing cavity and includes a sun gear 62 supported on the shank of the input shaft 14 and rigidly attached to the flange 54 by a pin 64. The planetary gear train further includes a ring gear 66 seated in counterbore 26 of the shell 18 and held rigid with respect to the housing by annular shoulder 40 on the cap and by the machine screws 44 which extend through appropriate apertures in the ring gear. A trio of planet gears 68 are disposed in meshing engagement between the sun gear and the ring gear. A generally cylindrical carrier member 70 having therein three angularly spaced and outwardly opening semicircular grooves 72 is disposed within the shell 18 and rotatably supported in counterbore 24. Each of the planet gears 68 is rotatably supported on the carrier member 70 within a respective one of the grooves 72 by a corresponding one of a trio of pivot pins 74 pressed into the carrier member. The carrier member further includes an internal cylindrical surface 76 into which surface are milled a plurality of generally V-shaped serrations 78, the surface 76 being disposed about the bearing surface 56 of the input shaft 14 in coaxial relation thereto.

Figure 3:
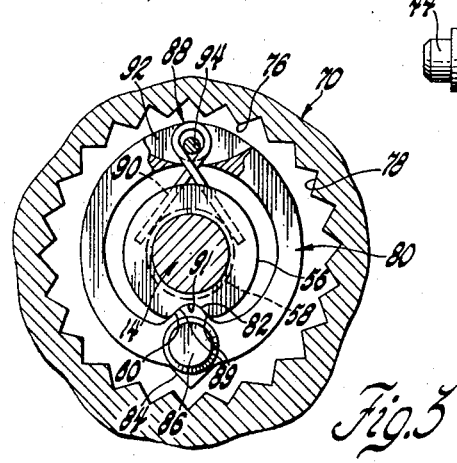
FIG. 3 is a fragmentary sectional view taken generally along the plane indicated by lines 3—3 in FIG. 2.

As seen best in FIGS. 2 and 3, an annular pawl member 80 is disposed about the input shaft 14 between the bearing surface 56 and the cylindrical surface 76 and includes a generally radially inwardly projecting low-ratio tooth 82, a generally radially outwardly projecting high-ratio tooth 84, and a pivot shaft 86 projecting generally perpendicularly to the plane of the pawl member. The pivot shaft 86 is slidably and rotatably disposed within the slot 50 in the flange 48 on the output shaft so that the pawl member is rotatable as a unit with the output shaft while being limitedly pivotable relative thereto about the axis defined by pivot shaft 86 and bodily movable relative thereto in a radial direction as defined by slot 50 between a retracted position, FIG. 3, and an extended position, not shown.

As seen best in FIG. 3, when the pawl member is in the retracted position thereof, the low-ratio tooth 82 seats within the pawl receptacle 60 on the input shaft, the low-ratio tooth thus directly rigidly coupling the input and output shafts to establish therebetween a unitary torque transmission ratio. In the extended position of the pawl member, however, the high-ratio tooth 84 engages one of the serrations 78 in the carrier member 70 to thereby couple the output shaft to the carrier member, the bearing surface 56 and cylindrical surface 76 being so spaced apart that only one of the high-ratio and low-ratio teeth may be engaged at any particular instant. When the output shaft is coupled to the planet carrier as described, torque delivered to the input shaft 14 is delivered to the output shaft through the sun gear, planet gears, and the planet carrier so that a transmission ratio is established between the shafts which exceeds unity.

To effect automatic alteration of the transmission ratio a coil torsion spring 88 having a pair of legs 90 is disposed within a cavity 92 in the pawl member on a pin 94 projecting through the cavity. Each leg 90 of the spring 88 seats in a respective one of the grooves 58 in the bearing surface 56 so as to exert a force on the input shaft 14 the reaction of which tends to lift the pawl member 80, FIG. 3. The spring 88 thereby resiliently biases the pawl member toward the retracted position thereof wherein low-ratio tooth 82 seats in pawl receptacle 60. To overcome the force of the spring 88 in response to the magnitude of the torque applied to the input shaft 14, cam and follower means are provided, the cam means being the sides 89 of the V-shaped pawl receptacle 60 and the follower means being the apex 91 of the low-ratio tooth 82. More particularly, as the torque applied to the input shaft increases, the force reaction between the appropriate side edge 89 of the pawl receptacle 60 and the apex 91 of the low-ratio tooth 82 develops an increasing force component urging disengagement between the tooth and the receptacle against spring 88. When the applied torque achieves a predetermined magnitude dependent upon the strength of the spring 88 the aforementioned force component initiates complete disengagement between the pawl receptacle 60 and low-ratio tooth 82 and consequently simultaneously initiates engagement between one of the serrations 78 and the high-ratio tooth 84 thereby effecting an alteration of the transmission ratio.

In a typical automotive steering application, the input shaft 14 is rigidly coupled to the steering wheel of the vehicle and the output shaft 16 is rigidly coupled to the input member of the power assisted steering gear. During normal vehicle operation the steering gear requires only a small torque input so that input shaft 14 is subjected to torque of small magnitude. Hence, the pawl 80 remains in the retracted position under the urging of spring 88 and establishes a unitary transmission ratio between the input shaft 14 and the output shaft 16. In the event of failure of the power assist means, the torque input requirement of the steering gear increases substantially, the increase necessitating a corresponding increase in the torque applied to input shaft 14. Accordingly, the vehicle operator, sensing the failure of the power assist means, applies increased torque to the steering wheel and hence to the input shaft 14 whereupon the cam surface 89 and cam follower 91 automatically initiate bodily movement of the pawl member from the retracted to the extended position to increase the transmission ratio. In the extended position of the pawl member 80, the operator need apply substantially less torque to the steering wheel to effect movement of the steerable road wheels although he must apply additional turns to the wheel.

It will, of course, be apparent that once the pawl achieves the extended position and the input shaft is rotated, relative rotation will occur between the input and output shafts. The bearing surface 56 then becomes operative to prevent return of the pawl member to the retracted position until the receptacle 60 is brought into alignment with the low-ratio tooth 82, such realignment insuring that the steering wheel will always assume a predetermined angular position when the vehicle is directed straight ahead. Further, should a particular serration 78 not lie in direct alignment with the path of motion of the pawl member as defined by slot 50 during movement of the pawl member from the retracted to the extended position, the apex of the high-ratio tooth will engage the side of the serration most nearly aligned therewith and initiate slight pivotal movement of the pawl member relative to the output shaft to accommodate the misalignment. When the pawl member achieves the extended position the misalignment disappears and the pawl member is pivoted back to its original position.

Having thus described the invention, what is claimed is:

1. A torque responsive dual ratio transmission mechanism comprising, a stationary housing, an input shaft, means rotatably supporting said input shaft on said housing, an output shaft, means rotatably supporting said output shaft on said housing in axial alignment with said input shaft, means defining a receptacle on said input shaft, a carrier member having receiving means thereon, means rotatably supporting said carrier member on said housing in coaxial relation to said input shaft, a pawl means, means supporting said pawl means on said output shaft for rotation as a unit therewith and for generally radial bodily movement relative thereto between a retracted position engaging said receptacle on said input shaft thereby to rigidly couple the latter to said output shaft to establish a unitary torque transmission ratio therebetween and an extended position engaging said receiving means on said carrier member to thereby rigidly couple the latter to said output shaft, a planetary gear train including a sun gear rotatable as a unit with said input shaft and a stationary ring gear on said housing and a plurality of planet gears meshingly engaging said sun gear and said ring gear, means rotatably supporting each of said planet gears on said carrier member so that when said pawl means is in the extended position thereof a torque transmission ratio exceeding unity is established between said input shaft and said output shaft, and cam means on said pawl means and on said input shaft responsive to the magnitude of the torque applied to said input shaft and operative to bodily move said pawl means from the retracted to the extended position thereof when said input shaft experiences torque exceeding a predetermined magnitude.

2. A torque responsive dual ratio transmission mechanism comprising, a stationary housing, an input shaft, means rotatably supporting said input shaft on said housing, an output shaft, means rotatably supporting said output shaft on said housing in axial alignment with said input shaft, a sun gear rigidly supported on said input shaft, a ring gear rigidly supported on said housing, a plurality of planet gears meshingly engaging said sun gear and said ring gear, a planet carrier having an internal cylindrical surface thereon, means rotatably supporting said planet carrier on said housing with said cylindrical surface disposed in coaxial relation to said input shaft, means defining a plurality of serrations on said cylindrical surface, an annular pawl having a low-ratio tooth projecting radially inward and a high-ratio tooth projecting radially outward, said pawl being disposed about said input shaft between the latter and said cylindrical surface, means on said input shaft defining a pawl receptacle, means supporting said pawl on said output shaft for rotation as a unit therewith and for generally radial bodily movement relative thereto between a retracted position wherein said low-ratio tooth engages said pawl receptacle thereby to rigidly couple said input shaft and said output shaft to establish a unitary torque transmission ratio therebetween and an extended position wherein said high-ratio tooth engages one of said serrations thereby to rigidly couple said output shaft to said planet carrier to establish a torque transmission ratio between said input and said output shafts exceeding unity, spring means biasing said pawl toward the retracted position thereof, means defining a cam surface on one of said low-ratio tooth and said pawl receptacle, and means defining a cam follower on the other of said low-ratio tooth and said pawl receptacle, said cam surface being engageable on said cam follower in the retracted position of said pawl and operative to bodily move the latter from the retracted to the extended position thereof when the torque applied to said input shaft exceeds a predetermined magnitude.

3. A torque responsive dual ratio transmission mechanism comprising, a stationary housing, an input shaft, means rotatably supporting said input shaft on said housing, an output shaft, means rotatably supporting said output shaft on said housing in axial alignment with said input shaft, means defining a pawl receptacle on said input shaft, a sun gear rigidly supported on said input shaft, a ring gear rigidly supported on said housing, a plurality of planet gears meshingly engaging said sun gear and said ring gear, a planet carrier having an internal cylindrical surface thereon, means rotatably supporting said planet carrier on said housing with said cylindrical surface disposed in coaxial relation to said input shaft, means defining a plurality of serrations on said cylindrical surface, an annular pawl having a low-ratio tooth projecting radially inward and a high-ratio tooth projecting radially outward and a pivot shaft projecting generally perpendicularly to the plane of said pawl, said pawl being disposed about said input shaft between the latter and said cylindrical surface on said planet carrier, means on said output shaft defining a generally radially extending slot, said slot slidably and rotatably receiving said pivot shaft thereby to support said pawl on said output shaft for rotation as a unit therewith and for limited pivotal movement relative thereto and for generally radial bodily movement relative thereto between a retracted position wherein said low-ratio tooth engages said pawl receptacle thereby to rigidly couple said input shaft and said output shaft to establish a unitary torque transmission ratio therebetween and an extended position wherein said high-ratio tooth engages one of said serrations thereby to rigidly couple said output shaft to said planet carrier to establish a torque transmission ratio between said input and said output shafts exceeding unity, a torsion spring having a pair of depending legs, means supporting said torsion spring on said pawl with said depending legs straddling said input shaft to exert a force on said pawl biasing the latter toward the retracted position thereof, means defining a cam surface on said pawl receptacle, and means defining a cam follower on said low-ratio tooth, said cam surface being engageable on said cam follower in the retracted position of said pawl and operative to bodily move the latter from the retracted to the extended position thereof when the torque applied to said input shaft exceeds a predetermined magnitude.

* * * * *